Nov. 30, 1943.   F. G. ZAGAR   2,335,721
INDEXING CHUCK
Filed Sept. 9, 1941
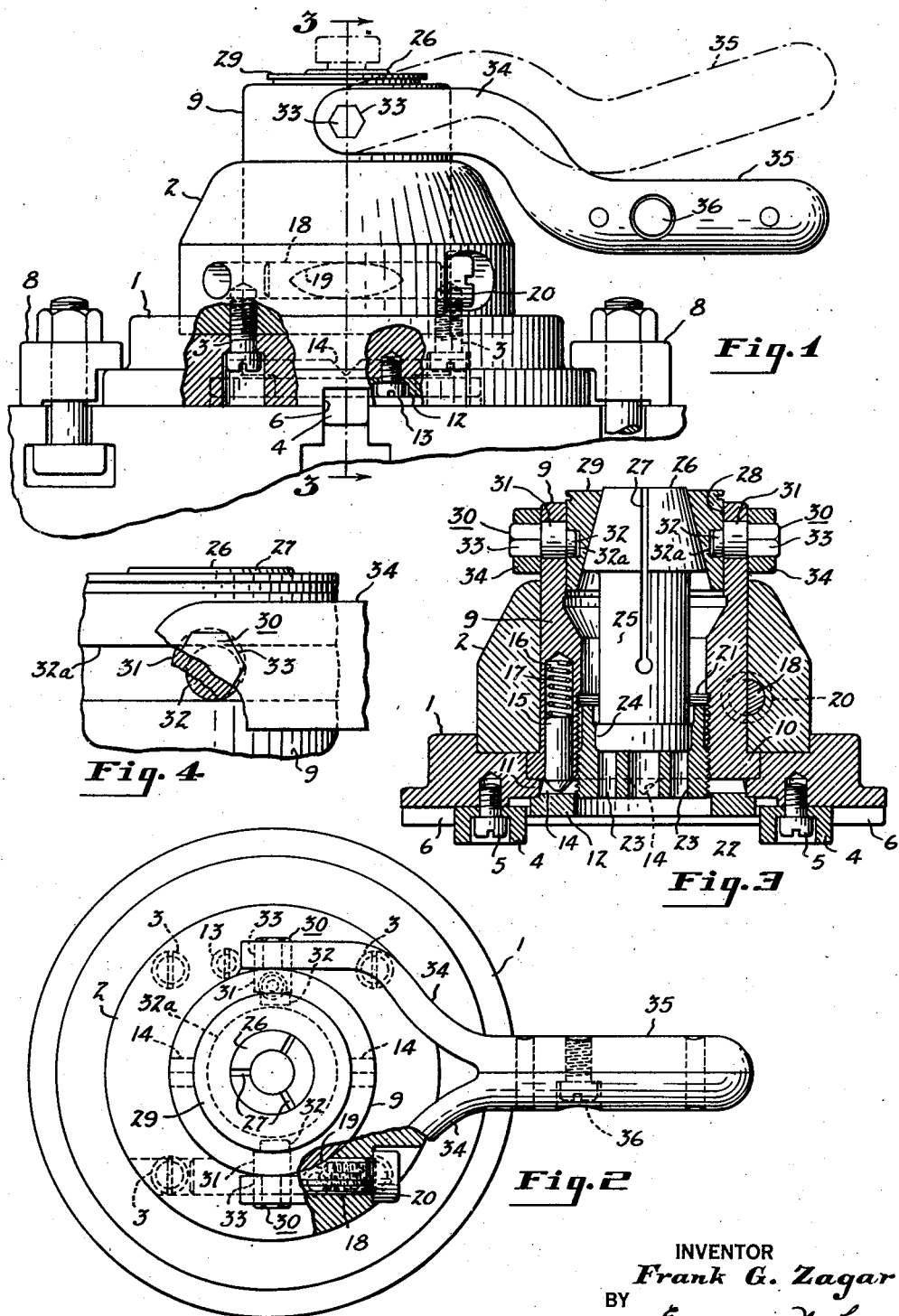
INVENTOR
*Frank G. Zagar*
BY
*Evans + McCoy*
ATTORNEYS Patented Nov. 30, 1943

2,335,721

UNITED STATES PATENT OFFICE 2,335,721

INDEXING CHUCK

Frank G. Zagar, Cleveland, Ohio, assignor to Zagar Tool, Inc., Euclid, Ohio, a corporation of Ohio Application September 9, 1941, Serial No. 410,166

8 Claims. (Cl. 279—50)

This invention relates to chucks and more particularly to chucks of the indexing type capable of holding a work-piece or tool in any one of a number of different angular positions.

Present invention has for its object to provide a chuck of simple and compact construction and which is provided with adjusting devices that are conveniently accessible and easily operable.

A further object of the invention is to provide a clamp actuating lever which is so mounted upon a rotatable clamp holder that when the clamp is set the lever may be used as a handle for turning the clamp holder to different positions of angular adjustment.

A further object is to provide a clamp in the form of a collet held between an axially moveable segment actuating collar and a seat which may be secured in various positions of axial adjustment so that the desired clamping movement may be imparted to the collet segments by movement of an actuating lever to a pre-determined position.

With the above and other objects in view, the invention may be said to comprise the chuck as illustrated in the accompanying drawing hereinafter described and particularly set forth in the appended claims, together with such variations and modifications thereof as will be apparent to one skilled in the art to which the invention pertains.

Reference should be had to the accompanying drawing forming a part of this specification, in which:

Figure 1 is a side elevation of the chuck, portions of which are broken away to show certain of the attaching bolts;

Fig. 2 is a top plan view of the chuck, a portion of the clamp actuating lever being broken away to show the sleeve clamp by means of which the chuck may be locked in various positions of angular adjustment;

Fig. 3 is a section taken on the line indicated at 3—3 in Fig. 1;

Fig. 4 is a fragmentary detail view on an enlarged scale, showing one of the cams for operating the clamping collar.

Referring to the accompanying drawing, the chuck of the present invention is provided with an annular base member 1 to which a tubular body portion 2 is rigidly secured by means of bolts 3. The base member 1 may be adjustably mounted upon a bed or other suitable support. As herein shown, the base member has keys 4 attached thereto by means of bolts 5 and adapted to slide in a way 6 formed in a bed 7. The base member 1 is secured in adjusted position by suitable means, such as clamps 8.

Within the tubular member 2 a sleeve 9 is rotatably mounted. The sleeve 9 projects beyond the outer end of the body member 2 and has a flange 10 at its inner end which is received between the inner end of the body member 2 and a shoulder 11, formed on the base member 1. Closely adjacent to the inner end of the sleeve 9 there is an index ring or plate 12 which is rigidly attached to the base member 1 by suitable means such as bolts 13. The side of the index ring 12, facing the inner end of the sleeve 9, is provided with angularly spaced notches 14 which are adapted to receive the rounded or tapering end of a pin 15 which is mounted in a longitudinal bore 16 in the wall of the sleeve 9. A spring 17 is interposed between the inner end of the pin 15 and the bottom of the bore 16 to yieldably press the pin into engagement with the index ring. The pin 15 engaging in the notches 14, serves to hold the sleeve 9 in any one of a number of angular positions with respect to the fixed body portion of the chuck. The tapering form of the notches 14 and of the end of the pin 15 engaging with the notches, permits the pin to be forced out of a notch when a turning force is applied to the sleeve 9.

For some kinds of work it is desirable that the sleeve be positively locked in adjusted position and for positively locking the sleeve, a locking pin 18 is slidably mounted in a transverse bore in the body member 2, the bore being so positioned as to partially over-lap the sleeve receiving bore of the body member 2. The locking pin 18 has a concave recess 19, intermediate its ends, which conforms to the cylindrical external surface of the sleeve 9. An adjusting screw 20 is threaded into one end of the pin 18. The locking pin 18 is adapted to be positioned so that its concave recess 19 conforms to the cylindrical interior surface of the body member 2 and in this position permits the sleeve 9 to be assembled within the body member and allows the sleeve to turn freely within the body member. By turning the screw 20, the pin 18 may be moved axially to exert a wedging, clamping pressure against the sleeve 9 to positively lock the sleeve against turning movements.

The sleeve 9 has an internally threaded portion 21 at its inner end into which may be screwed an externally threaded seating member 22 which is adapted to pass through the interior of the index ring 12 and which is provided with axially extending apertures 23, adapted to receive the pins of a spanner wrench. The seating member 22 has a recess 24 on the inner side thereof, which is adapted to receive the inner end of a collet 25 and serves to position the collet in the sleeve. The collet 25 has an enlarged tapering head 26 at its outer end and is provided with longitudinal slots 27 extending inwardly from its outer end which divides the head 26 into spaced clamping segments. The upper end of the sleeve 9 is provided with a counterbore 28 in which is slidably mounted a clamping collar 29, the interior of which engages the tapered head 26 of the collet. The external surface of the head 26 is preferably conical and its taper is preferably toward the outer end of the collet and the interior of the collar 29 is preferably formed to fit upon the conical surface of the head 26. The clamping collar 29 when moved axially in a direction to press the collet 25 against the positioning member 22 has wedging engagement with the clamping segments of the head 26 and forces the segments inwardly into gripping engagement with a shank or spindle inserted in the collet.

Axial movements are imparted to the collar 29 by means of two cams 30 which have cylindrical bearing portions 31 journaled in diametrically opposite openings in the sleeve 9. Each cam 30 has an inwardly projecting pin 32 which is eccentrically disposed with respect to the bearing portion 31 and which engages in a groove 32a in the collar 29. Each cam 30 has a polygonal outer end portion 33 which projects laterally from the outer face of the sleeve 9 and these polygonal outer end portions 33 fit in polygonal openings formed in the forks 34 of a lever 35. The forks 34 of the lever 35 straddle the sleeve 9 and sufficient clearance is provided between the forks 34 and the sleeve 9 to permit the necessary swinging movements of the lever. The bearing portions 31 of the cams are axially aligned and provide pivots for the lever. Since the polygonal portions 33 of the cams prevent turning movement of the cams with respect to the lever, the lever imparts a turning movement to the cams through an angle corresponding to the angular movement of the lever. For convenience in assembly, the lever 35 may be made in two parts detachably secured together by suitable means such as a bolt 36. In Fig. 1 of the drawing, the lever 35 is shown in full lines in collet clamping position and in dotted lines in releasing position. When the lever is moved from the dotted line position shown in Fig. 1 to the full line position, the eccentric pins 32 force the collar 29 inwardly to clamping position. The lever 35 in the clamping position is disposed at substantially right angles to the axis of the sleeve 9 so that it forms a convenient handle by means of which the sleeve may be turned from one position of angular adjustment to another.

The adjustment of the collet seating member 22 adjusts the collet head 26 with respect to the clamping collar 29 so that a movement of the lever to clamping position will impart a greater or lesser radial movement to the clamping segments of the collet head. This adjustment permits proper clamping engagement of spindles or shanks of varying sizes when the cam actuating lever is moved to clamping position.

It is to be understood that variations and modifications of the specific devices herein shown and described for purposes of illustration, may be made without departing from the spirit of the invention.

What I claim is:

1. An indexing chuck comprising a body member, a sleeve rotatably mounted in the body member, means for holding said sleeve in various positions of angular adjustment with respect to the body member, a tubular collet open at its outer end, mounted within said sleeve and having an enlarged tapering head at its outer end, said collet being slotted longitudinally from said outer end to provide spaced clamping segments, a collet positioning seat within said sleeve with which the inner end portion of said collet engages, a clamping collar slidable axially in the sleeve and engaging the tapered head to actuate the clamping segments, and means including a lever pivoted to said sleeve for imparting axial movements to said collar.

2. An indexing chuck comprising a body member, a sleeve rotatably mounted in the body member, means for holding said sleeve in various positions of angular adjustment with respect to the body member, a clamping collar mounted for axial sliding movement in the outer end of said sleeve, an axially adjustable collet positioning seat within said sleeve, a collet within the sleeve engaging said seat and having tapering clamping segments at its outer end engaged by said collar, and means carried by said sleeve for imparting an axial movement to said collar to actuate said clamping segments and to press said collet against said seat.

3. An indexing chuck comprising a body member, a sleeve rotatably mounted in the body member, means for holding said sleeve in various positions of angular adjustment with respect to the body member, a tubular collet open at its outer end, mounted within said sleeve and having an enlarged tapering head at its open end, said collet being slotted longitudinally from said open end to provide spaced clamping segments, a seat within said sleeve with which said collet engages to hold the collet against axial movement in one direction, a clamping collar slidable axially in the sleeve and engaging the tapered head to actuate the clamping segments and press the collet against said seat, a forked lever having axially alined pivot pins fixed thereto and journaled in diametrically opposite openings in said sleeve and cams carried by said pins and engaging the said collar for imparting axial movements to said collar.

4. An indexing chuck comprising a body member, a sleeve rotatably mounted in the body member, said sleeve being open at its outer end, means for holding said sleeve in various positions of angular adjustment, a collet seat within the sleeve adjacent its inner end, a clamping collar mounted to slide axially, within the sleeve adjacent its outer end, a collet within the sleeve having its inner end engaging said seat and provided with an externally conical outer end portion tapering toward the outer end of the collet and composed of clamping segments engaging the interior of said collar, cams engaging said collar for moving the collar axially to clamping or releasing position, and means for actuating said cams including an actuating lever pivoted to said sleeve to swing about an axis transverse to the sleeve axis and movable from a releasing position to a clamping position substantially perpendicular to the sleeve axis, whereby said lever when in clamping position may serve as a handle for turning said sleeve, within the body member.

5. An indexing chuck comprising a body member, a sleeve rotatably mounted in the body member, means for holding said sleeve in various positions of angular adjustment with respect to the body member, a clamping collar mounted for axial sliding movement in the outer end of said sleeve, an axially adjustable seating member within said sleeve, a collet within the sleeve engaging the seating member and having outwardly tapering clamping segments at its outer end engaged by said collar, cams engaging said collar for moving the collar axially to clamping or releasing position, and means for actuating said cams including an actuating lever pivoted to said sleeve to swing about an axis transverse to the sleeve axis and movable from a releasing position to a clamping position substantially perpendicular to the sleeve axis, whereby said lever when in clamping position may serve as a handle for turning said sleeve within the body member.

6. An indexing chuck comprising a body member, a sleeve rotatably mounted in the body member, means for releasably holding the sleeve in various positions of angular adjustment, a tubular collet open at its outer end, mounted within said sleeve and having an enlarged head at its open end tapering toward the open end, said collet being slotted longitudinally from said open end to provide spaced clamping segments, a seat within said sleeve with which the inner end of said collet engages, a clamping collar slidable axially in the sleeve and engaging the tapered head to actuate the clamping segments, and means including a lever pivoted to said sleeve for imparting axial movements to said collar and for turning said sleeve.

7. In a chuck of the character described a tubular member, a collet mounted within said member and having spaced clamping segments, a collar slidable within the tubular member for actuating said segments, and means for sliding said collar comprising a pair of cams journaled in diametrically opposite openings in said tubular member and having eccentric portions engaging said collar, and a lever having forks straddling said tubular member and fixed to said cams.

8. An indexing chuck comprising a body member, a sleeve rotatably mounted in the body member, a tubular collet open at its outer end and mounted within said sleeve, said collet having a tapering outer end and being slotted longitudinally from its open outer end to provide clamping segments, a collet seating member mounted for axial adjustment in the inner end of said sleeve, a clamping collar slidably mounted in the outer end of said sleeve, and means carried by said sleeve for moving said collar axially to clamp said collet against said seating member and to actuate said clamping segments.

FRANK G. ZAGAR.